US009074099B2

(12) United States Patent
Chughtai et al.

(10) Patent No.: US 9,074,099 B2
(45) Date of Patent: Jul. 7, 2015

(54) BITUMINOUS COMPOSITION

(75) Inventors: Majid Jamshed Chughtai, Chester (GB); Jacques Colange, Colombes Cedex (FR); Denis Lebas, Petit Couronne (FR); David Strickland, Manchester (GB)

(73) Assignee: Shell Oil Company, Houston, TX (US)

( * ) Notice: Subject to any disclaimer, the term of this patent is extended or adjusted under 35 U.S.C. 154(b) by 259 days.

(21) Appl. No.: 13/580,223

(22) PCT Filed: Feb. 23, 2011

(86) PCT No.: PCT/EP2011/052641
§ 371 (c)(1),
(2), (4) Date: Oct. 16, 2012

(87) PCT Pub. No.: WO2011/104251
PCT Pub. Date: Sep. 1, 2011

(65) Prior Publication Data
US 2013/0210966 A1 Aug. 15, 2013

(30) Foreign Application Priority Data

Feb. 23, 2010 (EP) .................................... 10305176

(51) Int. Cl.
*C08L 95/00* (2006.01)
*C08L 9/00* (2006.01)
*C08L 25/10* (2006.01)
*C08K 3/06* (2006.01)
*C08L 9/06* (2006.01)
*C08L 53/02* (2006.01)

(52) U.S. Cl.
CPC . *C08L 95/00* (2013.01); *C08L 9/00* (2013.01); *C08L 25/10* (2013.01); *C08K 3/06* (2013.01); *C08L 9/06* (2013.01); *C08L 53/02* (2013.01); *C08L 2555/22* (2013.01); *C08L 2555/52* (2013.01); *C08L 2555/54* (2013.01); *C08L 2555/80* (2013.01)

(58) Field of Classification Search
USPC .......................................................... 524/71
See application file for complete search history.

(56) References Cited

U.S. PATENT DOCUMENTS

| 3,738,853 A | 6/1973 | Kopvillem et al. |
| 3,970,468 A | 7/1976 | Garrigues et al. |
| 4,130,516 A * | 12/1978 | Gagle et al. ...................... 524/71 |
| 4,154,619 A | 5/1979 | Pronk |
| 4,211,575 A | 7/1980 | Burris |
| 5,718,752 A | 2/1998 | Kluttz .......................... 106/273.1 |
| 5,863,971 A | 1/1999 | Baanders et al. ............... 524/68 |
| 6,057,390 A * | 5/2000 | Loza et al. ..................... 524/68 |
| 6,133,351 A | 10/2000 | Hayner ........................... 524/62 |
| 6,380,284 B1 | 4/2002 | Lopez .............................. 524/59 |
| 6,863,724 B2 * | 3/2005 | Bailey et al. ............. 106/287.32 |
| 8,557,034 B2 * | 10/2013 | Colange et al. ........... 106/284.4 |

FOREIGN PATENT DOCUMENTS

| CN | 101560332 A | * 10/2009 |
| GB | 2384240 | 7/2003 |
| WO | 03014231 | 2/2003 |

OTHER PUBLICATIONS

CN 101560332 A, Oct. 2009, Derwent Ab.*
Martinez-Estrade, et al; "Comparative Study of the Effect of Sulfur on the Morphology and Rehological Properties of SB- and SBS-Modified Asphalt"; Journal of Applied Polymer Science, vol. 115; pp. 3409-3422; 2010.
Timm, D. et al.; "NCAT Report 09-05: Evaluation of Mixture Performance and Structural Capacity of Pavements Using Shell Thiopave"; National Center for Asphalt Technology Received from the Internet: http://www.ncat.s/reports/repo9-05.pdf; pp. 1-91; Aug. 2009.
Hurley, GC.; et al; "NCAT Report 05-06: Evaluation of Sasobit for Use in Warm Mix Asphalt"; Retrieved from Internet, http://www.eng. auburn.edu/center/nat/reports/rep05-06.pdf ; pp. 1-27; Jun. 2005.
Hurley, G.C. et al.; "NCAT Report 06-02: Evaluation of Evotherm for Use in Warm Mix Asphalt"; Retrieved from the Internet http://www. meadwestvaco.com/mwv/groups/content/documents/document/ mwv003429.pdf pp. 1-44; Jun. 2005.
Disclosed Anonymously; "Process for Preparing and Laying a Polymer Modified Asphalt Mixture at Lower Operating Temperatures"; Research Disclosure, Mason Publications, vol. 516, No. 55; p. 411; Apr. 2007.
Yildirim et al; "Polymer Modified Asphalt Binders"; Construction and Building Materials; vol. 21, No. 1; pp. 66-72; Jan. 1, 2007.

* cited by examiner

*Primary Examiner* — Satya Sastri
(74) *Attorney, Agent, or Firm* — Charles W. Stewart

(57) ABSTRACT

The invention provides a bituminous composition comprising a bitumen in an amount ranging from 20 to 80% wt, a copolymer comprising one or more vinyl aromatic compounds and one or more conjugated dienes, in an amount of 0.1 to 7 % wt, and sulphur in an amount of 20 to 60% wt, all percentages based on the weight of bitumen, copolymer and sulphur. It further provides a process for making this composition and asphalt compositions comprising such bituminous composition.

16 Claims, No Drawings

US 9,074,099 B2

BITUMINOUS COMPOSITION

PRIORITY CLAIM

The present application claims priority from PCT/EP2011/052641, filed 23 Feb. 2011, which claims priority from European patent 10305176.9, filed 23 Feb. 2010.

FIELD OF THE INVENTION

The present invention relates to a bituminous composition that comprises bitumen and a polymer. In particular it relates to bituminous compositions that comprise bitumen, a polymer and sulphur. The invention also relates to a process for manufacturing the bituminous composition; sulphur pellets; an asphalt composition comprising the bituminous composition, a process for manufacturing the asphalt composition; a process for preparing an asphalt pavement; and the asphalt pavement thus prepared.

BACKGROUND OF THE INVENTION

Bitumen is a material that is commonly used for the preparation of paving and roofing materials and for coatings such as for pipes and tank liners. In the road construction and road paving industry, it is a well-practised procedure to coat aggregate material such as sand, gravel, crushed stone or mixtures thereof with hot fluid bitumen, spread the coated material as a uniform layer on a road bed or previously built road while it is still hot, and compact the uniform layer by rolling with heavy rollers to form a smooth surfaced road.

The combination of bitumen with aggregate material, such as sand, gravel, crushed stone or mixtures thereof, is referred to as "asphalt". Bitumen, also referred to as "asphalt binder", is usually a liquid binder comprising asphaltenes, resins and oils. It may be naturally occurring, but may also be obtained from the residues of crude oils, e.g., by fractionation or by precipitation, e.g., by means of propane, or obtained after refining processes of crude oils, such as cracking. Bitumen usually contains hydrocarbons with a high asphaltene content, e.g., 12% wt or more. The bitumen may also have undergone some further treatment, e.g. blowing, whereby bitumen components are subjected to oxidation with oxygen, e.g. air, or a chemical component, e.g. phosphoric acid.

It is known to modify the properties of bitumen by the addition of polymers, in particular, thermoplastic rubbers. This has been described in U.S. Pat. No. 5,718,752. According to this patent document a bitumen-polymer mixture should meet a number of requirements in order to be suitable for paving materials. One of these requirements is that components of the mixture must be compatible. The polar asphaltene fraction tends to be incompatible with the polymer, which may lead to phase separation and therefore to a serious deterioration of the physical properties. Another requirement is the right flow behaviour to prevent rutting. It is therefore important that the mixture shows a satisfactory elasticity, since the material must be able to recover rather than just resist deformation. This characteristic is very important in a warm climate.

The bituminous compositions provided in U.S. Pat. No. 5,718,752 exhibits improved processability and compatibility, and comprise a specific radial block copolymer of polymer blocks of a vinylaromatic compound, such as styrene, and polymer blocks of a conjugated diene, such as butadiene.

In U.S. Pat. No. 5,863,971 it has been disclosed that high temperature rutting resistance and improved ageing behaviour can be accomplished if a hard blown bitumen is mixed with a thermoplastic rubber. Suitable thermoplastic rubbers include optionally hydrogenated block copolymers of a monovinyl aromatic compound, such as styrene, and a conjugated diene, such as butadiene or isoprene. The properties of the compositions with a hard bitumen are shown to be better than those of compositions with a softer bitumen that has not been subjected to a blowing treatment.

Compatibility problems between bitumen and polymers have been addressed in GB-A 2384240. Thereto, bitumen and the polymer were mixed, the mixture obtained was subjected to a blowing treatment and sulphur was added to the mixture during the blowing treatment. The purpose of the sulphur addition was to obtain cross-linking between the polymer molecules. Sulphur was added in an amount ranging from 0.01 to 2% wt, based on the weight of the bitumen and the polymer. The process resulted in products that were homogeneous.

The addition of sulphur to polymer-modified bitumens comprising styrene-butadiene or styrene-butadiene-styrene is addressed in detail by Martinez-Estrada et al in the Journal of Applied Polymer Science, Vo. 115, 3409-3422 (2010). The addition of relatively small amounts of sulphur is shown to greatly increase the thermal stability of the modified bitumens. However, it is stated that precise dosing of sulphur is extremely important as slight excess leads to gel formation. The skilled person is aware that addition of small amounts of sulphur may be beneficial, but would be wary of adding larger amounts due to the risk of gellation.

Bitumen compositions that contain sulphur and polymer have been described in WO-A 03/014231. These known compositions have been developed to provide improved paving binders. To obtain improved paving binders sulphur is added to a bitumen binder and aggregate, sand or other materials. The sulphur acts as a so-called asphalt additive and is used to render the binder less flowable. According to WO-A 03/014231 the paving binder may comprise polymers or polymerisable materials as further constituents. Examples of polymerisable material or polymers are styrene monomer, polyethylene terephthalate, ethyl vinyl acetate, Exxon 101 or Exxon 103 and other vinyl aromatics. The specification is silent about the effect these polymerisable compounds may have on the paving binder or the eventual asphalt.

It has now surprisingly been found that the elasticity of asphalt compositions containing polymer-modified bitumen can be further enhanced by the addition of sulphur. The inventors have added significant quantities of sulphur (from 20 wt %) to bitumen compositions, without experiencing the gellation that has been mentioned in the prior art. These bitumen compositions have advantageously been used to provide asphalt compositions with enhanced elasticity.

SUMMARY OF THE INVENTION

Accordingly, the present invention provides a bituminous composition comprising a bitumen in an amount ranging from 20 to 80% wt, a copolymer comprising one or more vinyl aromatic compounds and one or more conjugated dienes, in an amount of 0.1 to 7% wt, and sulphur in an amount of 20 to 60% wt, all percentages based on the weight of bitumen, copolymer and sulphur.

The present invention also relates to a process for manufacturing the bituminous composition according to the present invention, the process comprising the steps of:
(i) heating bitumen;
(ii) mixing the hot bitumen so obtained with an amount of sulphur in the range of from 20 to 60 wt %, based on the weight of the bitumen, copolymer and sulphur; wherein from 0.1% to 7% by weight of copolymer, based on the weight of bitumen, copolymer and sulphur, is added in at least one of the steps (i) or (ii).

The bituminous composition according to the present invention can advantageously be applied in road and roofing applications, preferably road applications.

The present invention further relates to an asphalt composition comprising an aggregate and the bituminous composition according to the present invention.

The present invention also provides a process for manufacturing the asphalt composition according to the present invention, the process comprising the steps of:
(i) heating bitumen;
(ii) heating aggregate;
(iii) mixing the hot bitumen with the hot aggregate in a mixing unit to form an asphalt composition; wherein from 20 to 60 wt % of sulphur, based on the weight of bitumen, copolymer and sulphur, is added in at least one of steps (i), (ii) or (iii); and wherein from 0.1 to 7 wt of copolymer, based on the weight of bitumen, copolymer and sulphur, is added in at least one of the steps (i), (ii) or (iii).

It has been found that the asphalt compositions of the present invention have excellent elasticity properties. It has further been found that the asphalt compositions according to the present invention show an excellent stiffness so that the load on the asphalt is well spread. This makes the asphalt excellently suitable for paving applications.

The present invention in addition also provides a process for preparing an asphalt pavement, wherein an asphalt composition is prepared by means of the present asphalt composition manufacturing process, followed by the steps of:
(iv) spreading the asphalt composition into a layer; and
(v) compacting the layer.

The present invention further relates to an asphalt pavement prepared by means of such a process.

DETAILED DESCRIPTION OF THE INVENTION

The bituminous composition of the present invention comprises three essential components: bitumen, sulphur and copolymer.

The bitumen can be selected from a wide range of bituminous compounds. Whereas some documents in the prior art prescribe that the bitumen must have been subjected to blowing before it is to be used in paving applications, such requirement is not needed in the compositions according to the present invention. So, bitumen that can be employed may be straight run bitumen, thermally cracked residue or precipitation bitumen, e.g., from propane. Although not necessary, the bitumen may also have be subjected to blowing. The blowing may be carried out by treating the bitumen with an oxygen-containing gas, such as air, oxygen-enriched air, pure oxygen or any other gas that comprises molecular oxygen and an inert gas, such carbon dioxide or nitrogen. The blowing operation may be conducted at temperatures of 175 to 400° C., preferably from 200 to 350° C. Alternatively, the blowing treatment may be conducted by means of a catalytic process. Suitable catalysts in such processes include ferric chloride, phosphoric acid, phosphorus pentoxide, aluminium chloride and boric acid. The use of phosphoric acid is preferred.

The bitumen content in the bitumen composition according to the invention may range from 20 to 80% wt, based on the weight of bitumen, sulphur and copolymer, more preferably from 30 to 75%. Good results have been obtained with amounts ranging from 50 to 75% wt.

The copolymer used in the present invention may be selected from a wide range of polymeric compounds. Although several vinylaromatic compounds may be selected for these copolymers, the preferred vinyl aromatic compound includes styrene. The styrene component may contain up to 10% wt of other vinylaromatic compounds, so that preferably the vinylaromatic compound consists of at least 90% mol of styrene. Substantially pure styrene is particularly preferred. The preferred dienes are selected from the group consisting of butadiene and isoprene, wherein butadiene is particularly preferred. Accordingly, it is suitable to use styrene butadiene rubber.

Although styrene butadiene rubber can suitably be used for achieving an increase in elasticity properties, it is preferred to use block copolymers of the vinylaromatic compound, preferably styrene, and the diene, preferably butadiene or isoprene as copolymer. The block copolymers may be linear or radial or mixtures of these. When the block copolymer is linear, the block copolymer is preferably selected from the groups consisting of those of formulae A(BA)m, wherein A represents a block of poly(vinylaromatic compound), wherein B represents a block of poly(butadiene) or poly(isoprene), and wherein m represents an integer ≥1. Most preferably, the block copolymer is a linear styrene-butadiene-styrene block copolymer of formula A(BA)m wherein A is a polystyrene block, B is a polybutadiene block and m=1.

When the block copolymer is a radial polymer the arms suitably consist of one or more blocks of poly(vinylaromatic compound) and one or more blocks of poly(diene). The number of blocks per arm may vary and is suitably from 2 to 6. The vinylaromatic compound is preferably styrene and the diene is preferably butadiene or isoprene. The arms are connected to a coupling agent. Any known coupling agent may be used, e.g., those that are listed in U.S. Pat. No. 5,718,752. Suitable coupling agents include silicon compounds and oligomers of divinylbenzene. Examples of suitable silicon compounds are silicon tetrahalides, bis(trihalosilyl)alkane, such as bis(trichlorosilyl)ethane, and hexahalosilane, such as $Cl_3SiSiCl_3$, wherein the halogen may be fluorine, chlorine or bromine. The number of arms may vary from 3 to 20. When the block copolymer is a radial copolymer, it is preferably selected from the groups consisting of those of formulae (AB)nX, wherein A represents a block of poly(vinylaromatic compound), wherein B represents a block of poly(butadiene) or poly(isoprene), wherein X represents the moiety of a multivalent coupling agent, and wherein n represents an integer ≥3.

The copolymer in the composition of the present invention comprises vinylaromatic compound and diene, wherein the vinylaromatic compound is preferably styrene and the diene is preferably butadiene or isoprene. The content of polyaromatic compound in the copolymer may vary. As indicated in U.S. Pat. No. 5,718,752 the polar asphaltene fraction in the bitumen may be incompatible with the polymer. Therefore, dependent on the nature of the bitumen the composition of the block copolymer may be varied. Generally, it has been found advantageous to use copolymers of vinylaromatic compound and diene wherein the vinylaromatic compound is present in an amount ranging from 10 to 50% wt, preferably from 15 to 40% wt, based on the weight of the copolymer. When the copolymer is a linear block copolymer the content of vinylaromatic compound is suitably present in the two terminal blocks. When the copolymer is a radial block copolymer it is preferred that each arm contains vinylaromatic compound within the range of 10 to 50% wt, based on the weight of each arm.

During the polymerisation of the copolymer with diene, it is evident to the skilled person that the polymerisation of the diene can occur via a 1,2-polymerisation or a 1,4-polymerisation. As a result of 1,2 polymerisation vinyl groups will be present. Preferably, the vinyl content in the copolymer does not exceed 50%, and more preferably is in the range of 10 to 25%, based on the weight of the diene in the copolymer.

The weight average molecular weight of the copolymer will normally be in the range of from 100,000 to 500,000, preferably from 250,000 to 450,000 and more preferably, from 300,000 to 400,000. When the copolymer is a block copolymer the blocks of poly(vinylaromatic compound) suitably have a molecular weight ranging from 3,000 to 100,000, preferably from 5,000 to 40,000. The blocks of polydiene suitably have a molecular weight of from 10,000 to 250,000, preferably from 40,000 to 200,000. It is evident that when radial block copolymers are being used the molecular weight of the blocks per arm may be on the low side of the range so that the total molecular weight does not become too high, since this may cause incompatibility problems.

The content of the copolymer in the bituminous composition according to the invention is from 0.1 to 7% wt, preferably from 0.1 to 5% wt, based on the total weight of bitumen, copolymer and sulphur. According to the teachings of U.S. Pat. No. 5,718,752 the amount of copolymer should be at least 2 parts per 100 parts of the bituminous composition in order to obtain the enhanced properties, amongst which an improved fatigue resistance. Since the copolymer tends to be the more expensive component in the composition the skilled person would consider the required relatively high content of copolymer as a disadvantage. In the composition of the present invention the content of the copolymer may be as high as 7% wt. However, excellent results are also obtained with lower copolymer contents; preferred copolymer contents range from 0.2 to 3% wt, more preferably from 0.5 to 1.8% wt, based on the weight of bitumen, copolymer and sulphur.

The copolymer in the composition according to the present invention may be hydrogenated. Especially in the case of block copolymers, in particular linear block copolymers, these copolymers may have been subjected to partial hydrogenation, so that the poly(vinylaromatic compound) blocks are unaffected and the poly(diene) blocks are hydrogenated to blocks of polyolefin blocks, e.g. ethylene/butylenes when butadiene is hydrogenated, and ethylene/propylene when isoprene is hydrogenated. Such hydrogenation of these copolymers tends to improve the compatibility of such copolymers with the bitumen.

Examples of suitable copolymers for use herein include Kraton D1101, a linear styrene-butadiene-styrene block copolymer commercially available from Kraton Polymers US LLC, Houston, Tex., USA, and UPM 5000, a styrene-butadiene rubber, commercially available from Ultrapave (Quality Asphalt Additives), a division of Textile Rubber & Chemical Company, 1300 Tiarco Drive S.W., Dalton, Ga. 30720, USA.

Sulphur constitutes an essential part of the binder material. Therefore, substantial amounts of sulphur are being used. That is different from the use of sulphur as cross-linking agent, where amounts usually below 2% wt, based on the weight of bitumen, sulphur and copolymer, are employed. In the application of the current invention the sulphur is present in amounts ranging from 20 to 60% wt, based on the weight of bitumen, copolymer and sulphur. The strength enhancement that is being provided to the bitumen composition by the sulphur is reduced when less than 20% wt of sulphur is being used in the bitumen composition according to the invention. Preferably, the sulphur is present in an amount ranging from 25 wt %, more preferably from 30 wt %. Preferably the sulphur is present in an amount up to 55 wt %. Most preferably the sulphur the sulphur is present in an amount of from 30 to 50 wt %. In the bitumen composition herein, crosslinking does take place by way of the sulphur being present, but more sulphur is present than can crosslink.

As described in WO-A 03/014231 the sulphur may be added to the bitumen composition in the form of sulphur pellets, and preferably, the sulphur is incorporated into the compositions of the present invention in this form. Reference herein to pellets is to any type of sulphur material that has been cast from the molten state into some kind of regularly sized particle, for example flakes, slates or sphere-shaped sulphur such as prills, granules, nuggets and pastilles or half pea sized sulphur. The sulphur pellets typically comprise from 50 to 100 wt % of sulphur, based upon the weight of the sulphur pellets, preferably from 60 wt % and most preferably from 70 wt %; and typically to 99 wt %, and preferably to 95 wt % or to 100 wt %. A more preferred range is from 60 to 100 wt %.

These pellets may contain carbon black and, optionally, other ingredients, such as amyl acetate and wax. Carbon black may be present in amounts up to 5% wt, based on the pellet, preferably up to 2% wt. Suitably, the content of carbon black in the sulphur pellet is at least 0.25% wt. The content of other ingredients, such as amyl acetate and wax, typically does not exceed an amount of 1.0% wt each. When wax is present, it may be in the form of, for example, slack wax or wax derived from a Fischer-Tropsch process. Examples of suitable waxes for use herein are Sasobit®, a Fischer-Tropsch derived wax commercially available from Sasol, and SX100 wax, a Fischer-Tropsch wax from Shell Malaysia.

In one embodiment of the present invention, the copolymer is present in the sulphur pellet.

Whereas the bituminous composition according to the invention comprises the three essential components, bitumen, copolymer and sulphur, it is evident to the skilled person that to such a composition also different compounds may be added. For instance, the other polymers mentioned in WO-A 03/014231 may be added. Accordingly, the composition according to the present invention suitably also comprises an additional different polymer, the additional polymer having been selected from the group consisting of polymers containing one or more of the monomers ethylene, propylene, butylene, vinyl acetate, alkyl acrylate or methacrylate, glycidyl acrylate or methacrylate, terephthalate and vinylaromatic compounds.

The bituminous composition according to the present invention may also comprise an odour suppressant such as, for example, those disclosed in EP 2185640.

The bituminous and asphalt compositions of the present invention may also comprise wax, for example, slack wax or wax derived from a Fischer-Tropsch process. Examples of suitable waxes for use herein are Sasobit®, a Fischer-Tropsch derived wax commercially available from Sasol, and SX100 wax, a Fischer-Tropsch wax from Shell Malaysia.

The bituminous and asphalt compositions of the present invention may also comprise anti-stripping agents.

The bitumen composition according to the invention is advantageously used in the form of an asphalt composition comprising the bitumen composition and filler and/or aggregate. Examples of fillers have been described in U.S. Pat. No. 5,863,971, and include carbon black, silica, calcium carbonate, stabilisers, antioxidants, pigments and solvents. Examples of aggregates include sand, rock, gravel, stones, pebbles etc. These aggregate materials are particularly useful for paving roads.

Typically, the asphalt composition comprises at least 1 wt % of bitumen, based on the weight of the asphalt composition. An asphalt composition comprising from about 1 wt % to about 10 wt % of bitumen is preferred, with a special preference for asphalt compositions comprising from about 3 wt % to about 7 wt % of bitumen, based on the weight of the asphalt composition.

The bitumen composition according to the present invention can be prepared by mixing the three ingredients in the appropriate amounts. In view of the properties of the bitumen and the copolymer that may lead to incompatibility problems, it is preferred to prepare a bitumen polymer mixture first and subsequently add sulphur.

Accordingly, the present invention provides a process for manufacturing the bituminous composition according to the present invention, the process comprising the steps of:
(i) heating bitumen;
(ii) mixing the hot bitumen so obtained with an amount of sulphur in the range of from 20 to 60 wt %, based on the weight of the bitumen, copolymer and sulphur; wherein the copolymer is added in at least one of the steps (i) or (ii).

The present invention also provides a process for manufacturing the asphalt composition according to the present invention, the process comprising the steps of:
(i) heating bitumen;
(ii) heating aggregate;
(iii) mixing the hot bitumen with the hot aggregate in a mixing unit to form an asphalt composition; wherein from 20 to 60 wt % of sulphur, based on the weight of bitumen, copolymer and sulphur, is added in at least one of steps (i), (ii) or (iii); and wherein from 0.1 to 7 wt of copolymer, based on the weight of bitumen, copolymer and sulphur, is added in at least one of the steps (i), (ii) or (iii).

In step (i) of the processes for manufacturing the present bituminous or asphalt compositions the bitumen is heated, preferably at a temperature of from 60 to 200° C., preferably from 80 to 150° C., more preferably from 100 to 145° C., and even more preferably from 125 to 145° C. Working above 120° C. has the advantage that sulphur is liquid which facilitates the mixing process. Although the skilled person can easily determine the optimal mixing time the mixing time may be relatively short, e.g., from 10 to 600 seconds.

The bitumen is preferably a paving grade bitumen suitable for road application having a penetration of, for example, from 9 to 1000 dmm, more preferably from 15 to 450 dmm (tested at 25° C. according to EN 1426:2007) and a softening point of from 25 to 100° C., more preferably of from 25 to 60° C. (tested according to EN 1427:2007).

In step (ii) of the process for manufacturing the present asphalt composition the aggregate is heated, preferably at a temperature of from 60 to 200° C., preferably from 80 to 170° C., more preferably from 100 to 160° C., even more preferably from 100 to 145° C. The aggregate is suitably any aggregate that is suitable for road applications. The aggregate may consist of a mixture of coarse aggregate (retained on a 4 mm sieve), fine aggregate (passes a 4 mm sieve but is retained on a 63 μm sieve) and filler (passes a 63 μm sieve).

In step (iii) of the asphalt manufacturing process, the hot bitumen and hot aggregate are mixed in a mixing unit. Suitably, the mixing takes place at a temperature of from 80 to 200° C., preferably from 90 to 150° C., more preferably from 100 to 145° C. Typically, the mixing time is from 10 to 60 seconds, preferably from 20 to 40 seconds.

The temperatures at which the bitumen and aggregate are heated and subsequently mixed are desirably kept as low as possible in order to reduce hydrogen sulphide emissions when the sulphur is added. However, the temperatures need to be sufficiently high such that the bitumen can effectively coat the aggregate. The present invention allows for bitumen, aggregate and sulphur mixes to be produced with suppression of odour emanating from the asphalt mixture.

In the process of manufacturing asphalt, sulphur is preferably added as late as possible in the process, preferably in step (iii).

In the processes of the present invention, it is preferable to add sulphur in the form of sulphur pellets, as described above.

The sulphur and the copolymer may be added together, i.e. both in step (i), step (ii) or step (iii) of the respective processes for manufacturing the present bituminous and asphalt compositions. In a first embodiment, the hot aggregate is mixed with the sulphur and the copolymer. Hot bitumen is then added to the hot aggregate-sulphur mixture. In a second embodiment, hot aggregate is mixed with hot bitumen, and the sulphur and the copolymer are added to the hot bitumen-aggregate mixture. This embodiment offers the advantage of producing a stronger sulphur-asphalt mixture strength. In a third embodiment, hot bitumen is mixed with sulphur and the copolymer and the resulting hot bitumen-sulphur mixture is mixed with hot aggregate to obtain a sulphur-comprising asphalt mixture.

Alternatively, in the asphalt manufacture process the copolymer may be added separately. For example, the copolymer may be added to the bitumen in step (i) and the sulphur may be added in step (iii).

In one embodiment of the invention, the sulphur and the copolymer are added together; the sulphur is in the form of pellets and the copolymer is incorporated in the sulphur pellets. The sulphur pellets preferably comprise from 0.1 to 28 wt % of the copolymer, based upon the weight of the sulphur, bitumen and copolymer. The sulphur pellets are suitably prepared by a process wherein liquid sulphur is mixed with the copolymer and optionally additional components such as carbon black or amyl acetate. The mixture is then shaped and/or pelletised.

In one embodiment of the invention sulphur may be added in the form of two types of sulphur pellets; a first type of sulphur pellet that comprises the copolymer and a second type of sulphur pellet that does not comprise the copolymer. This has the advantage that the copolymer is essentially concentrated in the first type of sulphur pellet and conventional sulphur pellets can be used to make up the rest of the sulphur requirement.

In a preferred embodiment of the present invention, the copolymer is added in step (ii) of the process for manufacturing asphalt compositions. In a particularly preferred embodiment, copolymer in the form of a liquid dispersion, is sprayed onto the hot aggregate to produce polymer-coated aggregate, then the polymer-coated aggregate is mixed with hot bitumen, followed by addition of sulphur, preferably in the form of pellets. Such a method is particularly advantageous in the case of a dispersion of styrene-butadiene rubber.

The invention further provides a process for preparing an asphalt pavement, wherein asphalt is prepared by a process according to the invention, and further comprising steps of:
(iv) spreading the asphalt into a layer; and
(v) compacting the layer.

The invention further provides an asphalt pavement prepared by the processes according to the invention.

The compaction in step (v) suitably takes place at a temperature of from 80 to 200° C., preferably from 90 to 150° C., more preferably from 100 to 145° C. The temperature of compaction is desirably kept as low as possible in order to reduce hydrogen sulphide emissions. However, the temperature of compaction needs to be sufficiently high such that the voids content of the resulting asphalt is sufficiently low for the asphalt to be durable and water resistant.

The invention will now be described by reference to examples which are illustrated by means of the following Examples, which are not intended to limit the invention.

EXAMPLE 1

A 100/150 pen bitumen was used for Example 1 having a penetration at 25° C. of 11.3 dmm (as measured by EN-1426), a softening point of 42.4° C. (as measured by EN-1427), a penetration index (Pfeiffer Index) of −1.3 and a relative density of 1.036.

The bitumen was mixed with Kraton D 1101, a linear styrene-butadiene-styrene block copolymer, comprising two terminal polystyrene blocks and a central butadiene block, commercially available from Kraton Polymers US LLC, Houston, Tex., USA. The styrene content of the block copolymer was 31% wt. Sulphur was added to the mixtures in the form of pellets consisting of approximately 99% wt sulphur and 1% wt carbon black.

The compositions of the various bitumen compositions used in the example are shown in Table 1.

TABLE 1

Bitumen Compositions A-I

| Sample | Bitumen, % wt | Copolymer, % wt | Sulphur, % wt |
|---|---|---|---|
| A* | 100 | 0 | 0 |
| B* | 70 | 0 | 30 |
| C* | 60 | 0 | 40 |
| D* | 99 | 1 | 0 |
| E* | 98 | 2 | 0 |
| F | 69.3 | 0.7 | 30 |
| G | 59.4 | 0.6 | 40 |
| H | 68.6 | 1.4 | 30 |
| I | 58.8 | 1.2 | 40 |

*Comparative Examples

The bitumen compositions were mixed with filler and aggregate to provide asphalt compositions. The aggregate consisted of five aggregate fractions: sand 0/2 mm, stones 2/4 mm, stones 4/6 mm, stones 6/10 mm and stones 10/14 mm. The percentages of the different aggregate fractions are given in Table 2 below.

TABLE 2

| Composition | Content in mass % |
|---|---|
| Limestone filler | 2 |
| Sand 0/2 mm | 30 |
| Stones 2/4 mm | 6 |
| Stones 4/6 mm | 8 |
| Stones 6/10 mm | 25 |
| Stones 10/14 mm | 29 |

The asphalt compositions were designed with 5.3-6.5 wt % binder content, based on the weight of the asphalt composition. The binder content was adjusted such that the volumetric compositions of the asphalts of the examples are essentially the same. The asphalt mixtures were produced at 140° C. in order to keep fumes emissions as low as possible (mainly hydrogen sulphide and sulphur dioxide). The asphalt compositions were compacted in a mould for slab production. Each slab had the following dimensions: 500 mm×180 mm×100 mm. At least one day after compaction the slabs were cored for producing cylindrical samples of 40 mm diameter and 80 mm height. The samples were left for 15 days in order to allow sulphur crystallization.

Complex Modulus and Phase Angle Measurements

The elasticity and stiffness characteristics of the asphalt compositions prepared using bitumen compositions A to I were determined by measuring the phase angle and complex modulus.

For visco-elastic materials, such as asphalt mixtures, when tested in their linear domain, the stress to strain relationship under a continuous sinusoidal loading is defined by its complex modulus (E*). The complex modulus is defined as the ratio of the complex amplitude of the sinusoidal stress and the complex amplitude of the sinusoidal strain for a given temperature and frequency. Due to the asphalt mixture viscoelastic properties, stress and strain are represented by its elastic modulus (E1) and its viscous modulus (E2). The absolute value of the complex modulus, |E*|, is called the stiffness modulus but also often called complex modulus. The phase angle represents the internal damping and can be used for the determination of the dissipated energy that is related to the fatigue behaviour of the material.

The measurements of the complex modulus were carried out with an electro-hydraulic machine, in accordance with standard test method EN 12697-26 (July 2004).

The tests were performed on cored specimens of 80 mm length and 40 mm diameter. The specimen was glued between two plates and a strain gauge was bonded on the specimen to measure the strain. The specimen was placed in a climate-controlled chamber. A sinusoidal load was applied on the sample inducing stress within the sample; the deformation of the sample was then recorded as the strain.

The test conditions were as follows. Three specimens were tested for a given asphalt mixture, at various temperatures (from −10° C. up to 30° C.) and at various loading frequencies (from 3 to 40 Hertz). The chamber temperature was stabilised at the test temperature during 1 hour before running the test at different frequencies. Then the test was carried out automatically at another temperature and so on. A sinusoidal load was applied for each frequency. After a couple of cycles, to obtain a stabilisation of the induced stress, the stress and strain values were recorded over a short period of time (less than one minute). This enabled the determination of the complex modulus as the ratio of maximum stress and maximum strain and the phase angle between the maximum applied stress and the maximum strain recorded. The results are shown in Tables 3 and 4 below.

TABLE 3

Phase Angle

| | Phase Angle δ, ° | | | | | |
|---|---|---|---|---|---|---|
| | 3 Hz | | 20 Hz | | 40 Hz | |
| Bit Comp | 0° C. | 30° C. | 0° C. | 30° C. | 0° C. | 30° C. |
| A* | 14.1 | 56.5 | 8.9 | 56.3 | 4.8 | 53.2 |
| B* | 13.2 | 56.9 | 8.3 | 52.9 | 8.0 | 49.1 |
| C* | 12.0 | 51.1 | 7.4 | 47.1 | 8.2 | 43.4 |
| D* | 13.9 | 58.7 | 9.2 | 56.2 | 10.4 | 52.5 |
| E* | 13.0 | 54.8 | 8.7 | 52.9 | 9.1 | 49.1 |
| F | 12.9 | 47.1 | 8.6 | 46.7 | 9.4 | 43.2 |
| G | 12.3 | 41.6 | 8.3 | 41.4 | 9.2 | 38.3 |
| H | 12.3 | 40.4 | 8.4 | 40.7 | 5.2 | 36.9 |
| I | 10.8 | 32.0 | 7.4 | 33.2 | 7.1 | 30.8 |

*Comparative Examples

TABLE 4

| | Complex Modulus | | | | | |
|---|---|---|---|---|---|---|
| | 3 Hz | | 20 Hz | | 40 Hz | |
| Bit.Comp | 0° C. | 30° C. | 0° C. | 30° C. | 0° C. | 30° C. |
| A* | 18853 | 343 | 23954 | 1307 | 25514 | 2065 |
| B* | 23157 | 552 | 29329 | 2037 | 31602 | 3150 |
| C* | 23595 | 836 | 29049 | 2660 | 30683 | 3902 |
| D* | 19165 | 369 | 24574 | 1392 | 25247 | 2162 |
| E* | 20736 | 514 | 26250 | 1790 | 27192 | 2738 |
| F | 21926 | 808 | 27705 | 2329 | 29201 | 3500 |
| G | 23688 | 1210 | 29617 | 3024 | 30858 | 4288 |
| H | 22375 | 1205 | 27845 | 2878 | 28034 | 4030 |
| I | 22628 | 2017 | 27626 | 3947 | 28468 | 5227 |

*Comparative Examples

The phase angle of the asphalt compositions does not change significantly when a copolymer is added. When sulphur is added, the asphalt composition does show a decrease in the phase angle. When both are added, the decrease is surprisingly and consistently further decreased especially at higher temperatures, indicating a more elastic behaviour of the asphalt compositions according to the invention. Hence, the compositions according to the invention are very advantageous for use in warm climates.

Turning to the complex modulus data, in absolute terms, the complex modulus values are lower at higher temperatures (as the visco component of the visco-elastic ratio becomes more dominant). Comparing comparative example A with comparative example D (both of which do not contain sulphur), there is an improvement in complex modulus on adding SBS polymer. Comparing comparative example B (sulphur, no SBS) with examples F and H (sulphur and SBS), the complex modulus is increased in Examples F and H indicating improved elastic behaviour of the asphalt compositions of the present invention.

EXAMPLE 2

Asphalt compositions were prepared by mixing hot bitumen with hot aggregate using conventional techniques wherein the bitumen binder had the compositions set out in Table 5 below. The weight percentages in Table 5 are by weight of the bitumen binder, the balance being made up with bitumen. The bitumen used in Example 2 had a bitumen penetration grade of 64-22. In the case of asphalt composition J, the bitumen binder consisted of bitumen only. In the case of examples K-P, the bitumen binder contained various amounts of sulphur, polymer and wax, as indicated in Table 5, in addition to bitumen. The weight % of bitumen binder used was in the range of 5-7 wt %, based on the weight of the asphalt composition. Sulphur was added in the form of Thiopave® pellets, commercially available from Shell, containing approximately 99 wt % sulphur and 1 wt % carbon black.

The Dynamic Modulus of the asphalt compositions J-P was measured using the method described in Example 1. Results are shown in Table 5 below.

The asphalt compositions J-P were also subjected to the Hamburg test (AASHTO T324-04) in which a loaded steel wheel applying a force of 705 +/− 22N) passes over an asphalt slab at 50° C. The rutting in mm was measured after 20,000 passes.

TABLE 5

| Asphalt Compositions: | J* | K* | L | M | N* | O | P |
|---|---|---|---|---|---|---|---|
| Polymer Type | — | SBS | SBS | SBS | SBR | SBR | SBR |
| Wt % polymer | 0 | 3 | 0.75 | 1.25 | 3 | 0.5 | 1 |
| Wt % sulphur | 0 | 0 | 29 | 29 | 0 | 29 | 29 |
| Wt % Sasobit (RTM)[1] | 0 | 0 | 1 | 1 | 0 | 1 | 1 |
| Dynamic Modulus, 40° C., MPa, average | 690 | 558 | 2533 | 2667 | 402 | 2565 | 3420 |
| Average, Hamburg, 50° C., Rut, mm | 5.6 | 5.8 | 2.8 | 3.0 | 12.7 | 2.4 | 2.6 |

*Comparative Examples
1. a Fischer-Tropsch derived wax commercially available from Sasol.

Discussion

The dynamic modulus values of asphalt compositions L and M are significantly increased compared to that of asphalt compositions J and K. In addition, the dynamic modulus values of compositions O and P are significantly increased compared to that of asphalt compositions J and N. These results demonstrate that the asphalt compositions of the present invention have improved elasticity properties.

The depth of rutting of asphalt compositions L and M is significantly decreased compared with the depth of rutting of asphalt compositions J and K. In addition, the depth of rutting of asphalt compositions O and P is significantly decreased compared with the depth of rutting of asphalt compositions J and N. These results illustrate that the asphalt compositions of the present invention have improved deformation resistance.

EXAMPLE 3

Asphalt compositions were prepared by mixing hot bitumen with hot aggregate using conventional techniques wherein the bitumen binder had the compositions set out in Table 6 below. The weight percentages in Table 6 are by weight of the bitumen, sulphur and copolymer. In addition to the quantities of bitumen, sulphur and copolymer specified in Table 6, all of the samples contained 1.5 wt % ethylene bis-stearamide, wherein the weight percentage is by weight of the bitumen and sulphur.

Four different bitumens were used. Bitumen A was a penetration grade bitumen having a penetration at 25° C. of 44 dmm. Bitumen B was a mixture of Bitumen A and a flux oil, Bitumen B having a penetration at 25° C. of 76 dmm. Bitumen C was another mixture of Bitumen A and a flux oil, Bitumen C having a penetration at 25° C. of 97 dmm. Bitumen D was a penetration grade bitumen having a penetration at 25° C. of 90 dmm. All penetrations were measured by EN-1426 (2007).

Three different copolymers were used. Copolymer 1 was Kraton D 1101, a linear styrene-butadiene-styrene block copolymer as used in Example 1. SBS 2 was Kraton D 1116, a radial triblock copolymer with a styrene content of 23%. SBS 3 was Kraton D 1118, a diblock copolymer with a bound styrene of 31% mass.

The stiffness modulus of the asphalt compositions was measured at 20° C., 30° C. and 40° C. in accordance with the procedure of EN 12967-26, and the results are shown in Table 6.

TABLE 6

| | Bitumen | | Sulphur | | Copolymer | Stiffness modulus (MPa) | | |
|---|---|---|---|---|---|---|---|---|
| | | | | | | 20° C. | 30° C. | 40° C. |
| i* | 70 wt % | Bitumen A | 30 wt % | | 0 | 6471 | 2049 | 574 |
| ii | 69.3 wt % | Bitumen A | 29.7 wt % | 1.0 wt % | Copolymer 1 | 6276 | 2209 | 692 |
| iii | 68.6 wt % | Bitumen A | 29.4 wt % | 2.0 wt % | Copolymer 1 | 6641 | 2437 | 791 |
| iv | 67.9 wt % | Bitumen A | 29.1 wt % | 3.0 wt % | Copolymer 1 | 7435 | 2524 | 912 |
| v | 67.2 wt % | Bitumen A | 28.8 wt % | 4.0 wt % | Copolymer 1 | 7136 | 2490 | 953 |
| vi* | 98 wt % | Bitumen A | 0 | 2 wt % | Copolymer 1 | 5749 | 1664 | 438 |
| vii* | 88.2 wt % | Bitumen A | 9.8 wt % | 2.0 wt % | Copolymer 1 | 5167 | 1439 | 459 |
| viii | 78.4 wt % | Bitumen A | 19.6 wt % | 2.0 wt % | Copolymer 1 | 6920 | 2064 | 696 |
| ix | 58.8 wt % | Bitumen A | 39.2 wt % | 2.0 wt % | Copolymer 1 | 9606 | 3759 | 1375 |
| x | 49.0 wt % | Bitumen A | 49.0 wt % | 2.0 wt % | Copolymer 1 | 11403 | 5190 | 2179 |
| xi | 69.6 wt % | Bitumen B | 29.4 wt % | 2.0 wt % | Copolymer 1 | 5165 | 1818 | 821 |
| xii | 69.6 wt % | Bitumen C | 29.4 wt % | 2.0 wt % | Copolymer 1 | 3974 | 1375 | 658 |
| xiii | 69.6 wt % | Bitumen A | 29.4 wt % | 2.0 wt % | Copolymer 2 | 7662 | 2389 | 795 |
| xiv | 69.6 wt % | Bitumen A | 29.4 wt % | 2.0 wt % | Copolymer 3 | 8805 | 2871 | 943 |
| xv* | 70 wt % | Bitumen D | 30 wt % | | 0 | 2491 | 936 | 488 |
| xvi | 69.3 wt % | Bitumen D | 29.7 wt % | 1.0 wt % | Copolymer 1 | 3227 | 1354 | 652 |
| xvii | 69.6 wt % | Bitumen D | 29.4 wt % | 2.0 wt % | Copolymer 1 | 3844 | 1496 | 839 |
| xviii | 67.9 wt % | Bitumen D | 29.1 wt % | 3.0 wt % | Copolymer 1 | 3572 | 1521 | 866 |
| xix | 67.2 wt % | Bitumen D | 28.8 wt % | 4.0 wt % | Copolymer 1 | 3775 | 1764 | 1035 |

*= Comparative Examples

The results show improvement in stiffness when comparing compositions comprising bitumen and sulphur but no copolymer with compositions comprising bitumen, sulphur and from 1-4 wt % copolymer (compare composition (i) with compositions (ii), (iii), (iv) and (v), or compare composition (xv) with compositions (xvi), (xvii), (xviii) or (xix)). There is a general trend towards increased stiffness with increased quantity of copolymer. The results also show considerable improvement in stiffness when comparing compositions comprising bitumen, 0-10 wt % sulphur and copolymer with compositions comprising bitumen, 20-50 wt % sulphur and copolymer (compare compositions (vi) and (vii) with compositions (viii), (ix), (iii) and (x)). Finally, the results show improvement in stiffness when comparing compositions comprising bitumen and sulphur but no copolymer, with compositions comprising bitumen, sulphur and three different copolymers (compare composition (i) with compositions (iii), (xiii) and (xiv)).

What is claimed is:

1. A bituminous composition comprising a bitumen in an amount ranging from 20 to 80% wt, a copolymer comprising one or more vinyl aromatic compounds and one or more conjugated dienes, in an amount of 0.1 to 7% wt, and sulphur in an amount of 20 to 60% wt, all percentages based on the weight of bitumen, copolymer and sulphur.

2. A composition according to claim 1, wherein the amount of bitumen ranges from 50 to 75% wt.

3. A composition according to claim 1, wherein the vinylaromatic compound includes styrene.

4. A composition according to claim 3, wherein the vinylaromatic compound consists for at least 90% mol of styrene.

5. A composition according to claim 1, wherein the dienes are selected from the group consisting of butadiene and isoprene.

6. A composition according to claim 1, wherein the copolymer is a block copolymer of the vinylaromatic compound and the diene.

7. A composition according to claim 1, wherein the block copolymer is a linear styrene-butadiene-styrene block copolymer of formula ABA wherein A is a polystyrene block and B is a polybutadiene block.

8. A composition according to claim 1, wherein the vinylaromatic compound in the copolymer of vinylaromatic compound and diene is present in an amount ranging from 10 to 50% wt, based on the weight of the copolymer.

9. A composition according to claim 1, wherein the copolymer is present in an amount ranging from 0.2 to 3% wt.

10. A process for manufacturing a bituminous composition according to claim 1, the process comprising the steps of:
 (i) heating bitumen;
 (ii) mixing the hot bitumen so obtained with an amount of sulphur in the range of from 20 to 60 wt %, based on the weight of the bitumen, sulphur and copolymer;
 wherein the copolymer is added in at least one of the steps (i) or (ii).

11. An asphalt composition comprising the bitumen composition according to claim 1 and filler and/or aggregate.

12. A process for preparing an asphalt composition comprising the steps of:
 (i) heating bitumen;
 (ii) heating aggregate;
 (iii) mixing the hot bitumen with the hot aggregate in a mixing unit to form an asphalt composition;
 wherein from 20 to 60 wt % of sulphur, based on the weight of bitumen, copolymer and sulphur, is added in at least one of steps (i), (ii) or (iii); and
 wherein from 0.1 to 7 wt of copolymer, based on the weight of bitumen, copolymer and sulphur, is added in at least one of the steps (i), (ii) or (iii).

13. A process according to claim 12 wherein the polymer is added in step (ii).

14. A process according to claim 12 wherein the sulphur is added in the form of sulphur pellets.

15. A composition according to claim 1, wherein the copolymer is present in an amount ranging from 0.5 to 1.8 % wt.

16. A composition according to claim 15, wherein the copolymer is a block copolymer comprising blocks of poly(vinylaromatic compound) having a molecular weight ranging from 5,000 to 40,000, and blocks of polydiene having a molecular weight of from 40,000 to 200,000.

* * * * *